United States Patent

[11] 3,575,567

| [72] | Inventors | Yasuhiro Nishio; Yoshihiro Yamamoto; Zenichiro Okamoto; Hiroshi Nakagawa, Hiroshima-ken, Japan |
|---|---|---|
| [21] | Appl. No. | 762,166 |
| [22] | Filed | Sept. 16, 1968 |
| [45] | Patented | Apr. 20, 1971 |
| [73] | Assignee | Mitsubishi Jukogyo Kabushiki Kaisha Tokyo, Japan |

[54] ELECTROSLAG WELDING METHOD
9 Claims, 13 Drawing Figs.

[52] U.S. Cl. .................................................. 219/73, 219/126
[51] Int. Cl. ........................................................ B23k 9/18
[50] Field of Search ........................................... 219/73, 126

[56] References Cited

UNITED STATES PATENTS

| 2,240,405 | 4/1941 | Kinzel | 219/73 |
| 2,357,432 | 9/1944 | Shrubsall | 219/73 |
| 3,243,568 | 3/1966 | Burden | 219/73 |
| 3,291,955 | 12/1966 | Shrubsall | 219/73 |
| 3,456,089 | 7/1969 | Shrubsall | 219/73 |
| 3,467,808 | 9/1969 | Dewez | 219/73 |

*Primary Examiner*—D. F. Duggan
*Assistant Examiner*—R. Skudy
*Attorney*—McGlew and Toren ABSTRACT: In an electroslag welding method employing a steel plate electrode inserted into the gap between the opposing surfaces of the base metal to be welded, at least that portion of the inserted electrode extending into the gap, when the overall width of the electrode is in excess of 300 mm., is divided into plural equal width sections each having a width of less than 300 mm. All of the sections of each electrode are commonly electrically connected to one terminal of a source of welding current. The electrode may comprise two physically separate sections commonly interconnected electrically to one terminal of the source, or may comprise a single electrode having that portion extending into the welding gap divided into two sections with the two sections being physically united to each other by that portion of the electrode outside the welding gap.

$$P_C = \frac{a_1 - b}{a_1} \times 100 \, (\%)$$

$$P_E = \frac{a_2 - b}{a_2} \times 100 \, (\%)$$

INVENTOR.
YASUHIRO NISHIO
YOSHIHIRO YAMAMOTO
ZENICHIRO OKAMOTO
BY HIROSHI NAKAGAWA

McHlew and Toren
ATTORNEYS

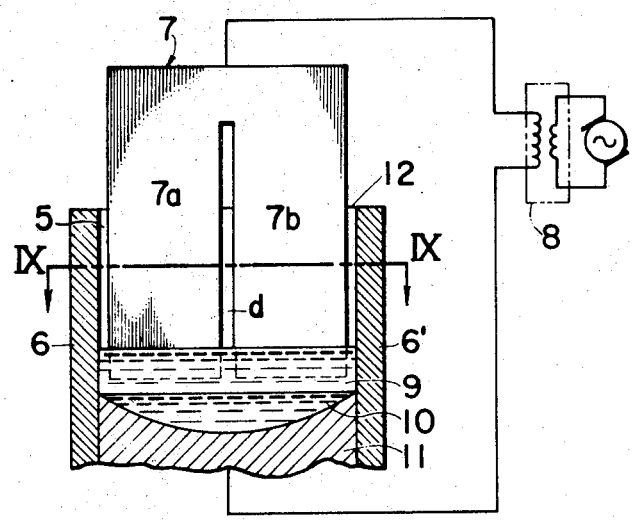
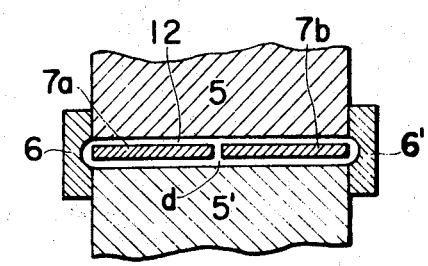
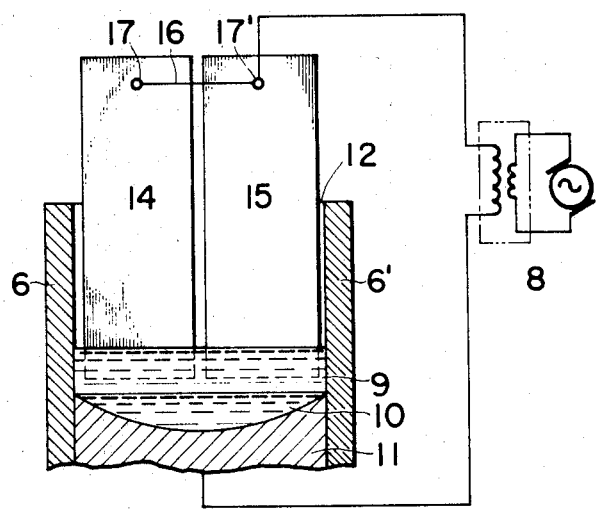
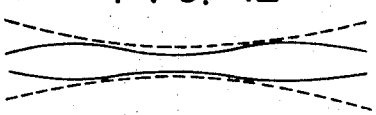
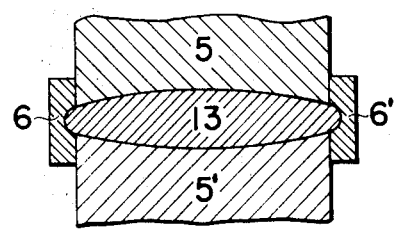

ELECTROSLAG WELDING METHOD

BACKGROUND OF THE INVENTION

1. Field of the Invention

This invention relates to an electroslag welding method employing a steel plate electrode.

2. Description of the Prior Art

In an electroslag welding method utilizing a steel plate electrode hitherto employed in general, a unitary steel plate electrode (hereinafter called single electrode) or a plurality of electrodes (hereinafter called multielectrodes) is inserted in the welding groove surrounded by base metals to be butt-welded in the gap or groove between the base metals. Thus welding is carried out, however, irrespective of the use of either single electrode or multielectrodes, the form of weld penetration to the base metals varies depending upon the width of the unit electrode.

The foregoing will now be explained with reference to the drawings. FIG. 1 to FIG. 4 illustrate sectional views showing a welding condition when electroslag welding employing a steel plate electrode is carried out by means of single electrode. FIG. 1 shows the welding conditions when the weld width and the groove width are comparatively small so that the electrode width is comparatively small. FIG. 2 shows the welding condition when the groove width is comparatively large so that the electrode width is comparatively large resulting in a large weld width. Further, FIG. 3 and FIG. 4 each show a sectional view of the welded portion after welding of FIGS. 1 and 2 has been completed.

In FIG. 1 and FIG. 2 a steel plate electrode 3 having a rectangular shape is inserted into a groove 12 surrounded by base metals 1, 1'. The adjacent terminal ends of these base metals are face to face defining therebetween an adequate gap. The sealing metals which are the same material as the base metal form the metal walls 2 2' are internally water-cooled. However, the penetration of the weld into the base metals are different as shown in FIG. 2, 3 and FIG. 4 depending upon the width of each steel plate electrode. In FIG. 3 there is shown the case of an electrode of comparatively small width in which the form of penetration of deposited metal 4 into the base metals shows a maximum penetration at the center of the weld width or electrode and gradually decreases on approaching both ends or outermost extremities of the weld width. On the other hand, there is shown in FIG. 4 the case of an electrode or weld having a comparatively large width in which the penetration of the weld into the base metals becomes minimum at the center of the electrode or weld and maximum at a position about midway between the center and both ends. Turning now to FIG. 5 and FIG. 6, there is shown a characteristic curve illustrating the above tendency. In FIG. 5, the electrode width $W$ is the abscissa. The ordinate is actually the result of a ratio $P_E/Pc$ as defined in FIG. 6. In FIG. 6 the $P_E$ which might be referred to as the penetration at the weld intermediate the center and the ends of the electrode, is determined by the formula as follows:

$$PE = \frac{a_2 - b}{a_2} \times 100$$

wherein $a_2$ is the width of the deposited metal and $b$ is the original distance between the base metals 1, $1_1$, of FIG. 2. The $Pc$ which might be referred to as the penetration at the weld center is determined by the following formula:

$$Pc = \frac{a_1 - b}{a_1} \times 100$$

wherein $a_1$ is the width of the deposited metal and $b$ is as above defined. Now, in FIG. 5, when the electrode or weld width is $W_1$ (FIG. 5 graph) or less so as to make $P_E/Pc=1.0$, then the cross section of the weld penetration will assume the form as shown in FIG. 3. However, if the electrode width $W$ becomes larger and approaches for example $W_2$ (FIG. 5), penetration rate $Pc$ for the base metal at the electrode center becomes extremely small. Under these circumstances, it has been found that $Pc=0$ as $W_2$ increases, whereby such condition will mean that the base metals at the weld or electrode center will not be welded to each other, that is, incomplete melting happens.

According to the test result, when the electrode width $W_1$ is between $W_1$ and $W_2$ that is when the electrode width rises from 300 mm. and becomes 550 mm., $Pc=22$ percent against $P_E=68$ percent, then the $P_E/Pc$ becomes about 3.0 which is satisfactory. However, when the electrode or weld width increases above 550 mm., the penetration for the base metals at the electrode center portion decreases sharply thus bringing about danger of incomplete welding. The incomplete welding of the base metals becomes a fatal defect that is very difficult to repair after welding.

The defect of incomplete penetration into the base metals as above explained remains as an internal defect, not only in case of single electrode welding but also in case of welding by multielectrodes respectively connected to an independent electric source and control device if the width of respective electrode greatly increases. This follows for single or multiple electrodes equally because in both cases penetration to the base metals at respective electrode center portion is not sufficiently carried out.

Thus, in electroslag welding it is generally desired to use a drooping characteristic, such a method as to control the feed speed of the electrode according to the welding voltage. In this method, although it is intended to control a plural number of electrodes connected to independent control units and welding sources by means of one electrode feed device, satisfactory welding cannot be performed as a whole because the feed speed cannot be controlled for all of these electrodes. Therefore, when carrying out welding by a plural number of sources by use of one unit of electrode feed device, the single electrode welding method is employed so that these sources may be connected in parallel and welding carried out by one control device. The width of the electrode employed for electroslag welding by use of the steel plate electrode usually has a width equal to the width of the base metal. Thus when the width of the base metal is large, the groove width is large and the electrode used therefore must have a large dimension of width. Therefore unfavorable welding so as to cause incomplete melting in the neighborhood of the center of electrode width as above explained is liable to happen.

OBJECT OF THE INVENTION

The present invention is to offer a welding method which is able to eradicate defects in the conventional welding method as explained above. Therefore it is an important object of this invention to carry out the electroslag welding by use of a steel plate electrode of which the portion expended for welding is divided into a plural number of individual electrodes each individual portion keeping an adequate interval from adjacent portions, and where all portions are connected or electrically activated in the widthwise direction, that is all are activated simultaneously and transversely across the weld width.

The steel plate electrode employed in the method of this invention is a single plate electrode having a large width at its upper portion while the lower portion or extremity of the electrode is divided into a plural number of individual and independent sections, each section separated from the other by a gap or an adequate interval. If desired, it is also possible to use a plural number of narrow steel plate electrodes arranged in side-by-side relationship in the widthwise direction each keeping an adequate interval. These individual separate but adjacent electrode plates can be further activated at the upper portion of each electrode.

SUMMARY OF THE INVENTION

In short, according to the electroslag welding method of this invention, when carrying out electroslag welding for a wide groove, that is for a wide weld, by use of steel plate electrodes, incomplete penetration to the base metals never happens in the neighborhood of the center of groove width or in the center portion of electrode width and uniform and perfect melting can be accomplished for the entire width, thereby the highest accuracy for the weld deposit as well as the highest efficiency for electroslag welding can be most advantageously achieved.

BRIEF DESCRIPTION OF THE DRAWINGS

FIG. 7 is a schematic view showing one embodiment of an electroslag welding method in accordance with this invention. FIG. 8 is a schematic view showing another embodiment of the invention. FIG. 9 is a cross-sectional view of V-V' in FIG. 7. FIG. 10 is a schematic view of the welded portion in FIG. 9. FIG. 11, 12 and 13 show comparison of the deposited metal according to this invention and that according to the conventional method.

DESCRIPTION OF PREFERRED EMBODIMENTS

Figure 1:
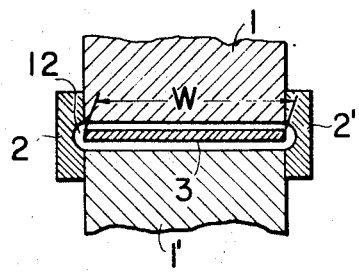
FIG. 1 is a schematic view of an electroslag welding method.

One embodiment of this invention will be explained below with reference to the drawings.

Turning to FIG. 7, there is shown a single electrode having a width of about 500 mm. being divided by gap $d$ its center portion, the gap extending above the upper surface of base metal 5 and thus above the electrode portion expended for welding.

In FIG. 7 and FIG. 9, a steel plate electrode 7 is inserted into welding groove 12 surrounded by the base metals 5, 5' which are in face to face relationship with respect to each other but with an adequate distance between opposed faces and further surrounded by water cooled sealing walls 6, 6'. Therefore electroslag welding may be carried out. However, because of a large width of the electrode necessary, the electrode 7 used is divided into two lower portions 7a and 7b with an adequate gap $d$ at the center of these portions 7a, 7b expended for welding. The electrode 7 is activated electrically on its upper undivided portion by connection to one or several welding power activating sources 8 operated in parallel. The melted slag 9, melted metal 10, and weld deposit 11 are all shown respectively in FIG. 7. The electrode 7 divided into lower portions 7a and 7b will be electrically activated in all portions in the same manner as a single electrode welding. However the penetration form for the base metals 5, 5' shows maximum penetration amount at center portion of the base metal being welded and the penetration amount gradually decreases on approach to both ends for a wide electrode when the electrode is separated into two portions 7a 7b. Accordingly, if incomplete melting should happen for a wide electrode, this takes place in the metal adjacent the surface of the base metals 5, 5' and therefore can be easily repaired. Further it is also possible to further reduce the possibility of any incomplete melted portion by increasing the depth of the groove 12 between the sealing walls or cooling walls 6, 6'. It must further be noted that if the distance $d$ between the divided electrode portions 7a 7b becomes too great, penetration will show the same defective form as in the case of a nondivided prior art wide electrode, so that this distance must be appropriately determined. According to the test result, the appropriate electrode distance or gap $d$ is below about 20 mm. The electrode 7 is therefore divided into two portions 7a and 7b separated by gap $d$ particularly when it is necessary to use an electrode having a large width in single electrode welding. However, the split electrode principal is further applicable for plural electrode welding when the series of electrodes is already divided into two or more electrodes in the multielectrode welding process.

Next, FIG. 8 shows electrodes 14 15 each having a comparatively narrow width, not more than about 250 mm. They are activated by a conductor 16 and bolts 17 17' on their upper portions, in this case the same effect can also be obtained as in the case of the first embodiment above explained. The width of 250—300 mm. is considered optimum since the ratio $P_E/Pc$ is 1.0 or less.

Figure 2:
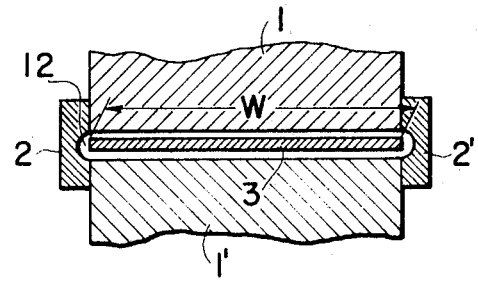
FIG. 2 is a schematic view of an electroslag welding method.
Figure 3:
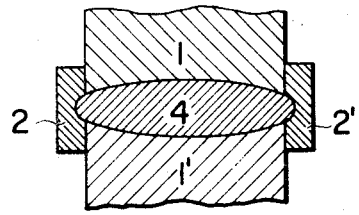
FIG. 3 is a sectional view of the welded portion of FIG. 1.
Figure 4:
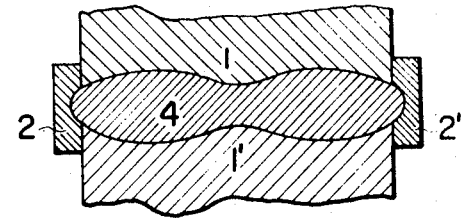
FIG. 4 is a sectional view of the welded portion of FIG. 3.
Figure 5:
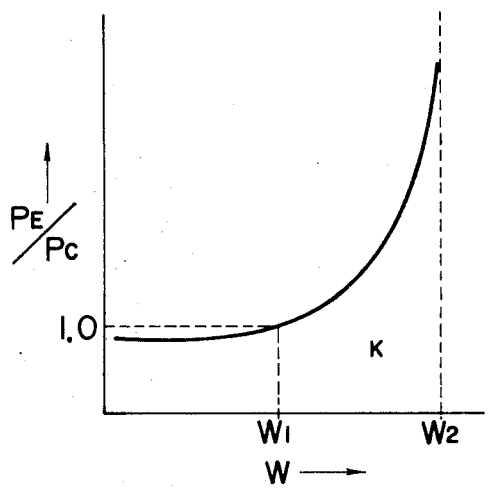
FIG. 5 is a graphic representation of the welding process relating deposited metal and electrode width.
Figure 6:
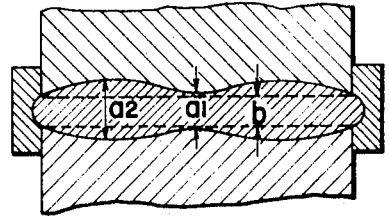
FIG. 6 is a sectional view of a welded portion and formula.

In order to appreciate fully the theoretical consideration as to the reason why there is a difference in the penetration form of welding in the case of a wide electrode divided at the portion expended for welding, or the case of narrow electrodes that are interconnected and electrically activated as a unit as compared to the case of a wide single electrode used in the electroslag welding employing plate form electrodes the following discussion is offered. Namely, this is due to superposed action of differences between the electrode terminal portion and the cooling effect according to the electrode position relative to the base metal weld width. Now explaining this with reference to FIG. 11 to FIG. 13 inclusive, FIG. 11 shows the form (solid outline) of deposited metal in the welded portion when welding is accomplished by a single electrode having a small width as shown in FIG. 1 being 300 mm. This follows because of a complementary weld width between the base metals. FIG. 12 shows the form (solid outline) of the deposited metal when welding is accomplished by a single electrode having a large width above 250 mm. in FIG. 2, that is, because of a comparatively large weld width between the base metals. FIG. 13 shows the form (solid outline) of the deposited metals when welding is accomplished by a single electrode that is divided at its center portion because of a comparatively large weld width between the base metals.

Assuming generally there is no difference in cooling effect if electroslag welding employing a rectangular electrode having a large width is used as compared with the plate thickness, current density in the widthwise direction of the electrode is not uniform. As the current density at the electrode innermost portion increases, the penetration amount for the base metals at the electrode center becomes minimum, while that for the base metals at the electrode innermost portions becomes maximum. Further this tendency becomes more conspicuous if the width of electrode is larger than 300 mm. because $P_E/Pc$ becomes greater than 1.0. As the width increases, the risk of improper melting at the weld center increases. However, there are differences in the cooling effect according to the base metal weld transverse width being affected. Thus the form of deposited metal substantially becomes as shown by the solid lines in FIG. 11, FIG. 12 and FIG. 13. That is, penetration amount at both innermost portions of the weld decreases due to cooling effect of the cooling wall metals. In the case of a comparatively narrow electrode, that is, in case of comparatively small width of the base metals 300 mm. or less, since the cooling effect at the outside areas of the weld portions does not reach to the center portion of the base metals, the penetration form becomes as shown by the solid outline in FIG. 11. However, and in case of a comparatively wide electrode, the cooling effect of the base metal reaches intermediate the center and end of the weld so that penetration becomes maximum at said portions, while it becomes minimum at center portion.

On the other hand, if the center portion of electrode having a large width is divided as the present invention, the penetration form becomes as shown by the dotted line in FIG. 13. This follows by reason of the electrode effect by which the cooling effect of the base metal innermost portions is controlled. Also in this case, because of comparatively large weld width of the base metals, this cooling effect reaches only to the portions intermediate the center and both ends. Thus the penetration amount somewhat decreases at the base metal outermost portions as shown by the solid outline in FIG. 13 and indicates maximum value at the center portion of base metals or weld width. Further in any case of FIG. 11, 12 and 13 the reason why the dotted line does not become equal to the solid outline in the base metal interior is due to the additional cooling effect inside the base metal itself.

While the form of apparatus herein described constitutes a preferred embodiment of the invention, it is to be understood that the invention is not limited to this precise form of apparatus, and that changes may be made therein without departing from the scope of the invention which is defined in the appended claims.

We claim:

1. In an electroslag welding method employing at least one steel plate electrode inserted into the welding gap between opposed surfaces of base metals to be weld united, to form at least part of the weld, the improvement comprising, with respect to each steel plate electrode having a width in excess of 300 mm., separating at least that portion of the electrode inserted into the welding gap into plural equal width sections spaced laterally from each other and each having a width not in excess of 300 mm.; and commonly electrically connecting all the sections of each inserted electrode to the same respective single terminal of a source of welding potential.

2. An electroslag welding method according to claim 1, including limiting the spacing between adjacent electrode sections in the gap to less than 20 mm.

3. An electroslag welding method, according to claim 1, in which only that portion of the electrode inserted into the welding gap is separated into sections, the portion of each electrode outside the welding gap constituting a unitary member physically uniting all of the associated sections.

4. An electroslag welding method, according to claim 1, in which the entire length of each steel plate electrode is separated into said sections; all of said sections being interconnected by a common electrical conductor connected to said respective single terminal of said source.

5. In electroslag welding employing at least one steel plate electrode inserted into the welding gap between opposed surfaces of base metal to be weld united, to form at least part of the weld, the improvement comprising, in combination, each steel plate electrode having at least that portion thereof inserted into the welding gap separated into plural equal width sections spaced laterally from each other; a source of welding potential, and means commonly electrically connecting all the sections of each inserted electrode to the same respective single terminal of source of welding potential.

6. In electroslag welding, the improvement according to claim 5, wherein the spacing between adjacent electrode sections is less than 20 mm. in width.

7. In electroslag welding, the improvement according to claim 6, wherein each section of the steel plate electrode, expended in welding, has a width not in excess of 300 mm.

8. In electroslag welding, the improvement according to claim 5, wherein said sections terminate short of the outer edge of said steel plate electrode in a continuous plate portion common to all sections; said electrical connecting means being connected to said common steel plate portion.

9. In electroslag welding, the improvement according to claim 5, wherein said sections extend throughout the length of the steel plate electrode; said last-named means comprising a conductor commonly electrically interconnecting all of said sections; and a second conductor electrically connected to said first-named conductor and to said same respective single terminal of said source.